No. 630,656. Patented Aug. 8, 1899.
C. CHRISTIANSON.
HARROW.
(Application filed Feb. 26, 1898.)
(No Model.) 2 Sheets—Sheet 1.

Witnesses
J. A. Walker.
H. L. Ames.

Inventor
Christian Christianson.
by V. D. Stockbridge
his Attorney

No. 630,656. Patented Aug. 8, 1899.
C. CHRISTIANSON.
HARROW.
(Application filed Feb. 26, 1898.)
(No Model.) 2 Sheets—Sheet 2.
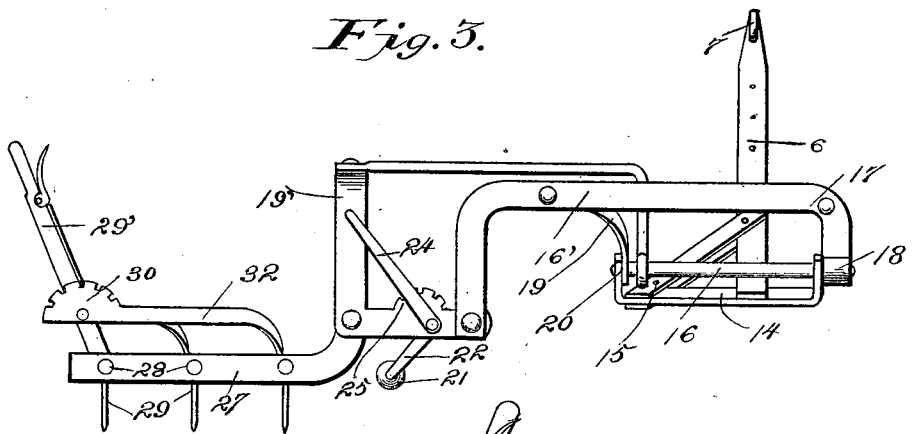
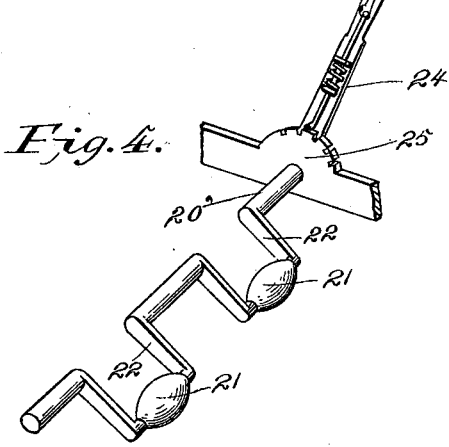 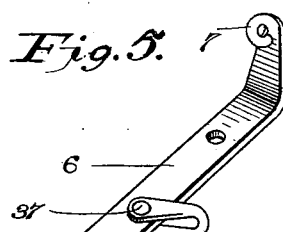
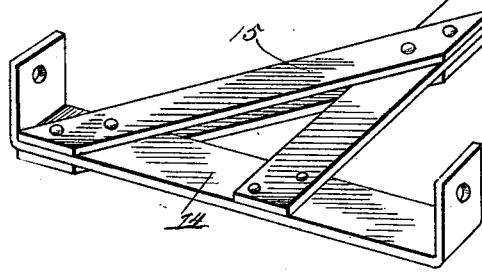
Witnesses
Inventor
Christian Christianson
by V. D. Stockbridge
his Attorney

UNITED STATES PATENT OFFICE.

CHRISTIAN CHRISTIANSON, OF GREENFIELD, SOUTH DAKOTA.

HARROW.

SPECIFICATION forming part of Letters Patent No. 630,656, dated August 8, 1899.

Application filed February 26, 1898. Serial No. 671,805. (No model.)

*To all whom it may concern:*

Be it known that I, CHRISTIAN CHRISTIANSON, a citizen of the United States, residing at Greenfield, in the county of Clay and State of South Dakota, have invented certain new and useful Improvements in Harrows; and I do hereby declare the following to be a full, clear, and exact description of the invention, such as will enable others skilled in the art to which it appertains to make and use the same.

This invention relates to a novel harrow attachment for plows, and has for its object the production of a simple, durable, and efficient harrow which may be readily attached to plows of any ordinary construction and which when so attached will effectually harrow and pulverize the earth as it is turned up into a furrow by the plow.

The invention consists in providing a light metallic frame having a harrow of any suitable form mounted thereon or connected thereto and in securing the harrow-frame to the plow in a manner to permit the entire attachment to be elevated out of contact with the ground by a lever upon the plow-handle, which when released will permit the attachment to drop back to bring the harrow into operative relation with the plow and cause the simultaneous plowing and harrowing of the ground without the necessity of going over the field twice, as in the ordinary use of agricultural implements.

Figure 1:
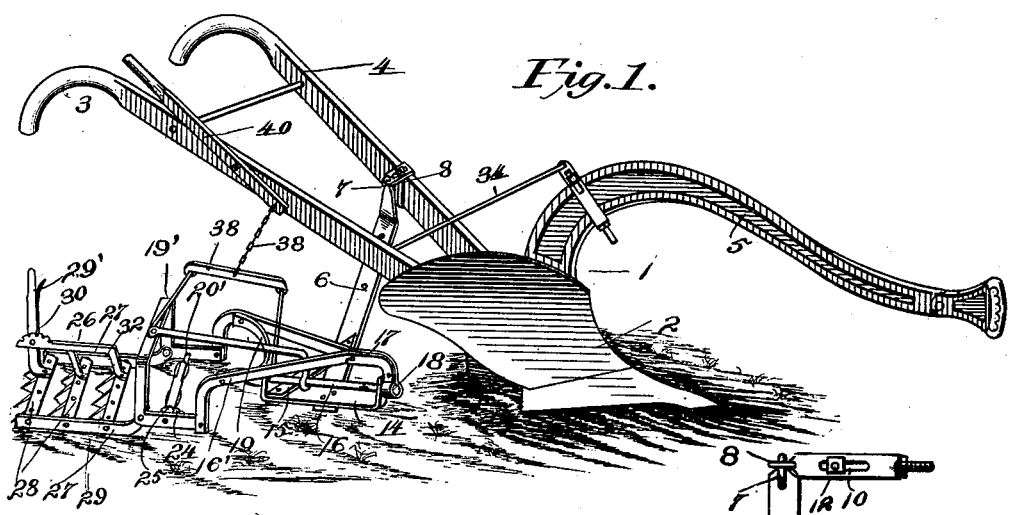
Figure 6:
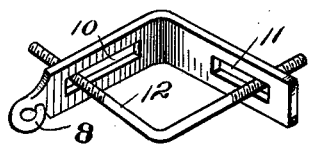
Figure 2:
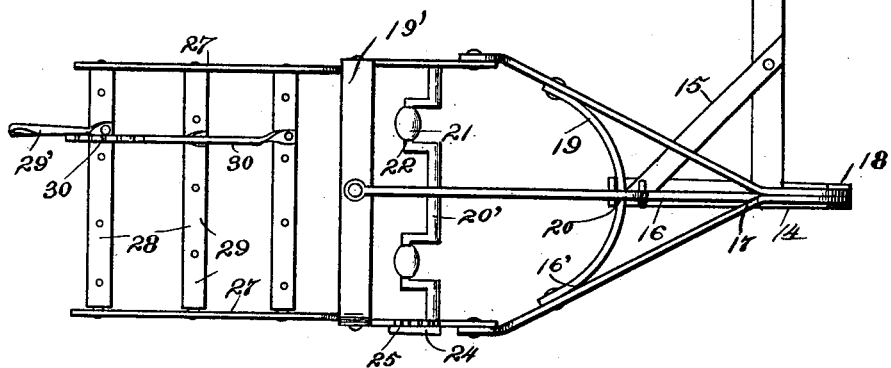

Referring to the drawings, Figure 1 is a perspective view of a plow provided with my attachment. Fig. 2 is a plan view, on a somewhat enlarged scale, of the harrow attachment detached. Fig. 3 is a side elevation thereof. Fig. 4 is a detail view of the pulverizer-shaft and its adjusting mechanism. Fig. 5 is a detail view of the supporting-arm, and Fig. 6 is a similar view of one of the clamps.

Referring to the numerals on the drawings, 1 indicates a plow of any suitable or ordinary construction, composed, as usual, of a share 2, a pair of upwardly and rearwardly inclined handles 3 and 4, and a beam 5. The form of plow illustrated is simply selected for the purpose of showing the mode of application of my invention and may be varied to suit the conditions under which it is desired to employ the device.

6 indicates what I will term the "swinging supporting-beam," provided with a hook 7 at one end, designed to engage a similar hook 8 upon a clamping-plate 9, bent in rectangular form and provided with slots 10 and 11, through which extend the threaded extremities of an angular clamping-bolt 12, provided with internal nuts. This clamp is designed to be secured upon the left-hand handle of the plow and is securely clamped thereon by screwing down the nuts upon the ends of the clamping-bolt. The outer extremity of the arms 6 is provided with a rectangular frame 14, bolted to the extremity of the arm and additionally secured by means of a pair of diagonal braces 15, terminally bolted or pivoted at their opposite extremities to the frame and arm.

16 indicates a swiveled bar rotatably mounted in the swiveled frame and upon which is mounted the harrow-frame 16', composed of a light metal strip 17, doubled upon itself to form an eye 18 in front of the swiveled frame and engaging a swiveled rod, and then extended upwardly and bent into a horizontal plane, the two side branches of the strip being bent rearwardly in divergent relation and downwardly at a suitable point in the rear of the swiveled frame, as illustrated. The branches of the strip are connected by a cross-bar 19, provided with an aperture 20, through which the swiveled rod extends, and the opposite extremities of the strip or frame are secured to the forward ends of what may be termed the "pulverizer-frame" 19', in which is rotatably mounted a transverse pulverizer-shaft 20', provided with a series of pulverizing-rollers 21, journaled in roller-bearing brackets 22, extending rearwardly from the shaft.

Any suitable means may be provided for permitting the shaft to elevate the rollers from contact with the ground; but I prefer to employ a lever 23 upon one end of the shaft, having a spring-latch 24, designed to engage a toothed segment 25, carried at one side of the pulverizer-frame.

26 indicates a harrow composed of the side bars 27, pivotally connected at their front ends to the pulverizer-frame and connected by pivoted or stationary transverse tooth-bars 28, provided with depending teeth 29 and designed to be adjusted to regulate the angle of the teeth by means of a tooth-bar-adjusting lever 29', provided with a spring-latch 30, engaging a toothed segment 31, the tooth-bar-adjusting lever being connected to a connecting-rod 32, pivotally connected to upwardly-extending arms 33, secured to the tooth-bars.

34 indicates a stay-rod pivotally connected to the arms 6 and provided with a clamp at its forward extremity, designed to be secured to the beam of the plow adjacent to the share. The stay-rod is adjustable upon the arm 6 by means of a series of apertures therein designed to receive a pivot-pin 37.

38 indicates a bail of any suitable form connected to the harrow and pulverizer-frame and having a flexible piece 39 connected at its opposite extremity to a lever 40, carried upon the right-hand handle of the plow and designed to enable the plowman to raise or lower the entire attachment when not in use.

From the foregoing it will be observed that I have produced a simple, durable, and efficient harrow attachment for plows supported by a swinging arm and provided with harrow-teeth and pulverizer-rollers, which may be thrown into or out of operation, as desired, the entire attachment being so mounted upon the supporting part by means of the hooks 7 and 8 that it is capable of the necessary forward and backward adjustment as well as the vertical undulations necessary to accommodate the device to the uneven surface of the ground; but, while the present embodiment of the invention seems to be preferable, I do not desire to limit myself to the structural details set out, but reserve the right to change, vary, or modify them at will within the scope of the protection prayed.

Having thus described my invention, what I claim as new, and desire to secure by Letters Patent, is—

1. The combination with a plow, of a laterally-extending swinging arm secured at one end to the plow, a frame carried by and pivotally mounted on the opposite end of the arm, and a harrow-frame pivotally connected to the pivoted frame on a horizontal transverse axis, substantially as specified.

2. In a harrow attachment of the character described, the combination with a supporting-arm provided with an attaching-clamp at one end, of a pivoted swivel-frame at its opposite end journaled on a longitudinal axis, a harrow-frame pivotally connected to the latter on a transverse axis, and independently-adjustable pulverizing-rollers mounted in the frame, substantially as specified.

3. The combination with a swinging supporting-arm, of a swivel-frame secured thereto in rear and to one side of the plow, a harrow-frame carried by the swivel-frame and journaled on a horizontal axis, a transverse pulverizing-shaft mounted in the frame and provided with roller-brackets and rollers therein, means for turning the pulverizer-shaft and raising and lowering the rollers, and a harrow connected pivotally to the harrow-frame, substantially as specified.

4. The combination with a swinging arm and a swivel-frame carried thereby, of a swivel-rod mounted in the frame, a harrow supported by the rod and susceptible of free lateral vibration, a pulverizer-frame constituting the rear end of the harrow-frame, a pulverizer-shaft journaled in the pulverizer-frame, brackets extending rearwardly from the shaft and rollers journaled in said brackets, a lever connected to the pulverizer-shaft designed to effect the adjustment of the pulverizer-rollers, a harrow connected to the pulverizer-frame and provided with adjustable tooth-bars longitudinally journaled, a bail connected to the harrow-frame, a lever designed to be carried by a plow, and a flexible piece intermediate of the bail and lever, whereby the latter may be actuated to raise the entire device out of contact with the ground, substantially as specified.

5. The combination with a plow, of a laterally-extended arm connected pivotally to one of the plow-handles by a swivel-clamp, a harrow-frame connected to the opposite extremity of the arm, and susceptible of vibration, pulverizing-rollers mounted in the frame, a harrow connected to said frame, a lever mounted upon one of the plow-handles and operatively connected with the harrow-frame, and a stay-rod adjustably and pivotally connected to the arm, and provided with a clamp at the opposite end designed to be secured to the plow-beam, substantially as specified.

In testimony whereof I affix my signature in presence of two witnesses.

CHRISTIAN CHRISTIANSON.

Witnesses:
C. H. CHRISTIANSON,
HANS PETER HANSON.